(12) United States Patent
McCann

(10) Patent No.: US 7,712,753 B2
(45) Date of Patent: May 11, 2010

(54) JOINT FOR VEHICLE STEERING AND SUSPENSION SYSTEM

(75) Inventor: Michael J. McCann, Roseville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 389 days.

(21) Appl. No.: 11/758,020

(22) Filed: Jun. 5, 2007

(65) Prior Publication Data

US 2008/0303234 A1    Dec. 11, 2008

(51) Int. Cl.
*F16D 1/12* (2006.01)
*F16D 3/10* (2006.01)

(52) U.S. Cl. .................... 280/93.511; 403/134

(58) Field of Classification Search ........... 280/93.511, 280/124.134, 93.512; 403/131, 134, 135, 403/149; 29/898.043, 898.047, 441.1
See application file for complete search history.

(56) References Cited

U.S. PATENT DOCUMENTS

| | | | | |
|---|---|---|---|---|
| 1,990,016 A * | 2/1935 | Alden et al. | ................. | 403/226 |
| 2,368,886 A * | 2/1945 | Schroeter | .................... | 384/214 |
| 2,521,335 A * | 9/1950 | Booth | ................. | 280/124.136 |
| 3,097,005 A * | 7/1963 | Fickler | .......................... | 403/6 |
| 3,166,333 A * | 1/1965 | Henley | ........................ | 277/635 |
| 3,290,073 A * | 12/1966 | Gottschald | .................. | 403/124 |
| 3,563,564 A * | 2/1971 | Bartkowiak | ............ | 280/93.512 |
| 3,749,415 A * | 7/1973 | Sampatacos | ......... | 280/124.136 |
| 3,817,640 A * | 6/1974 | Carter et al. | ................ | 403/138 |
| 3,999,870 A * | 12/1976 | Clark et al. | ................... | 403/36 |
| 4,070,121 A * | 1/1978 | Graham | ....................... | 403/27 |
| 4,101,227 A * | 7/1978 | Herbenar et al. | .............. | 403/27 |
| 4,113,396 A * | 9/1978 | Smith | ......................... | 403/138 |
| 4,154,544 A * | 5/1979 | Gair | ............................ | 403/59 |
| 4,334,795 A * | 6/1982 | Westphal | .................... | 403/131 |
| 4,629,352 A * | 12/1986 | Nemoto | ..................... | 403/128 |
| 4,844,505 A | 7/1989 | Higuchi | | |
| 4,986,689 A * | 1/1991 | Drutchas | .................... | 403/127 |
| 4,995,633 A | 2/1991 | Santo | | |
| 6,010,272 A * | 1/2000 | Littman | ...................... | 403/131 |
| 6,152,637 A * | 11/2000 | Maughan | .................... | 403/27 |
| 6,439,794 B2 * | 8/2002 | Schmidt | ..................... | 403/120 |
| 6,454,484 B1 * | 9/2002 | Parker et al. | ................ | 403/132 |
| 7,600,940 B1 * | 10/2009 | Byrnes et al. | ................. | 403/76 |
| 2003/0234504 A1 | 12/2003 | Frantzen | | |

FOREIGN PATENT DOCUMENTS

| | | | |
|---|---|---|---|
| DE | 4426881 A1 | 2/1996 | |
| DE | 10327554 A1 | 1/2005 | |
| JP | 52008257 | * 1/1977 | ................. 403/134 |

* cited by examiner

*Primary Examiner*—Paul N. Dickson
*Assistant Examiner*—Jordan Golomb

(57) ABSTRACT

The present invention concerns a steering and suspension system of a vehicle and a translational ball joint for use in a steering and suspension system. The system may include a lower joint assembly that employs the translational ball joint to couple a steering knuckle to a strut extension member. The translational ball joint may include a socket having a ball stud mounted therein, with the ball stud including a ball, mounted in the cavity, and a shank, including a cylindrical portion adjacent to the second end that is slidably received in a central bore of the ball and has a retention flange extending radially outward that has a diameter that is larger than a diameter of the central bore to thereby prevent the retention flange from sliding through the central bore.

10 Claims, 5 Drawing Sheets

JOINT FOR VEHICLE STEERING AND SUSPENSION SYSTEM

BACKGROUND OF INVENTION

The present invention relates generally to vehicle steering and suspension systems and, in particular, to a joint for use in a strut-type vehicle steering and suspension system.

Many automotive vehicles today employ a type of front suspension commonly known as a McPherson strut suspension. This type of suspension includes a strut assembly, with an upper strut mount affixed to a vehicle frame or body and a lower end affixed to a steering knuckle. The lower end of the steering knuckle also attaches, via a conventional ball joint, to a lower control arm, which is hinged to the vehicle frame or body. While this conventional suspension works well for many vehicle applications, it creates a spindle length—the distance from the wheel center plane to steer axis along the wheel rotation axis—that is larger than desirable. The steer axis is located away from the wheel center plane due to the fact that, with this suspension, it is defined by the ball joint and upper strut mount location. This large spindle axis undesirably increases steering system loads when tractive forces (front wheel drive), road profile impact forces, or rotating assembly imbalance forces are applied. This undesirable increase in steering system loads is particularly noticeable on front wheel drive vehicles with high-powered engines. On these types of vehicles, traction steer concerns may become apparent during combined acceleration and turn events.

While a different type of suspension may be provided for such high-powered vehicles, this may require substantial changes to the vehicle's frame or body to accommodate this different suspension. The cost to make these changes on an existing vehicle may be prohibitive, leaving one only the choice of the conventional suspension. Consequently, it is desirable to improve the suspension and steering performance on vehicles where the frame or body has already been designed specifically for a McPherson strut suspension without having to substantially modify the frame or body of that vehicle, and while remaining generally within the packaging space of the conventional McPherson strut suspension. Moreover, it is desirable to provide these improvements while also assuring that the fabrication and assembly of the components is relatively straight forward and easy, and while minimizing a need for special tools during assembly.

SUMMARY OF INVENTION

An embodiment contemplates a translational ball joint for connecting a first vehicle component to a second vehicle component that may comprise a socket, a ball stud and a retainer. The socket may have a side wall and an end wall defining a cavity, with the socket being mountable in the first vehicle component. The ball stud may include a ball, mounted in the cavity and having a central bore, and a shank, including a first end located outside of the cavity and an opposed second end located in the cavity, the shank including a cylindrical portion adjacent to the second end that is slidably received in the central bore and a retention flange extending radially outward from the second end that has a diameter that is larger than a diameter of the central bore to thereby prevent the retention flange from sliding through the central bore. The retainer may operatively engage the socket to retain the ball in the cavity of the socket.

An embodiment contemplates a steering and suspension system of a vehicle that may comprise a strut extension member having a strut clamp arm adapted for mounting to a strut assembly, an upper extension support arm extending from the strut clamp arm and including an upper receptacle, an extension fork extending from the strut clamp arm, and a lower extension support arm extending from the extension fork and including a lower receptacle; and a steering knuckle having an upper portion including an upper joint receptacle adjacent to the upper receptacle, and a lower portion having a lower joint receptacle adjacent to the lower receptacle. The steering and suspension system may also include an upper joint assembly and a lower joint assembly. The upper joint assembly engages the upper receptacle and the upper joint receptacle and pivotally couples the upper extension support arm to the upper portion. The lower joint assembly couples the lower extension support arm to the lower portion. The lower joint assembly includes a translational ball joint including a socket having a side wall and an end wall defining a cavity, the socket being mounted in the lower receptacle; a ball stud including a ball, mounted in the cavity and having a central bore, and a shank, including a first end extending through the lower joint receptacle and an opposed second end located in the cavity, the shank including a cylindrical portion adjacent to the second end that is slidably received in the central bore and a retention flange extending radially outward from the second end that has a diameter that is larger than a diameter of the central bore to thereby prevent the retention flange from sliding through the central bore.

An embodiment contemplates a method of forming a translational ball joint comprising the steps of: forming a socket having a cylindrical side wall affixed to a circular end wall and defining a cavity; forming a shank having a first end with threads adjacent thereto and a second end with a retention flange extending radially therefrom; forming a ball including a central bore having a diameter that is less than a diameter of the retention flange; sliding the shank into the central bore to form a ball stud; sliding the ball and the second end of the shank into the cavity such that the retention flange is adjacent to the end wall; and securing a retainer to the socket to prevent the ball from being removed from the cavity.

The translational ball joint in accordance with an embodiment provides for an additional degree of freedom—translation along the ball stud axis—while still allowing for manufacture and assembly using typical ball joint techniques.

The assembly in accordance with an embodiment advantageously provides a steering and suspension system with a short spindle length, where a steer axis defined by the system is relatively close to a wheel centerline plane, while also allowing for ease of assembly. The translational ball joint may be assembled into the system like a conventional ball joint, thus avoiding the need for special tools. Moreover, the steering and suspension system allows for easier assembly by being able to accept misalignment and tolerances of components, while still being able to assemble the components together. And the steering and suspension system, employing the translational ball joint, can generally be assembled into a vehicle having a frame or body that is configured to accept a conventional McPherson strut-type suspension.

DETAILED DESCRIPTION

Figure 1:
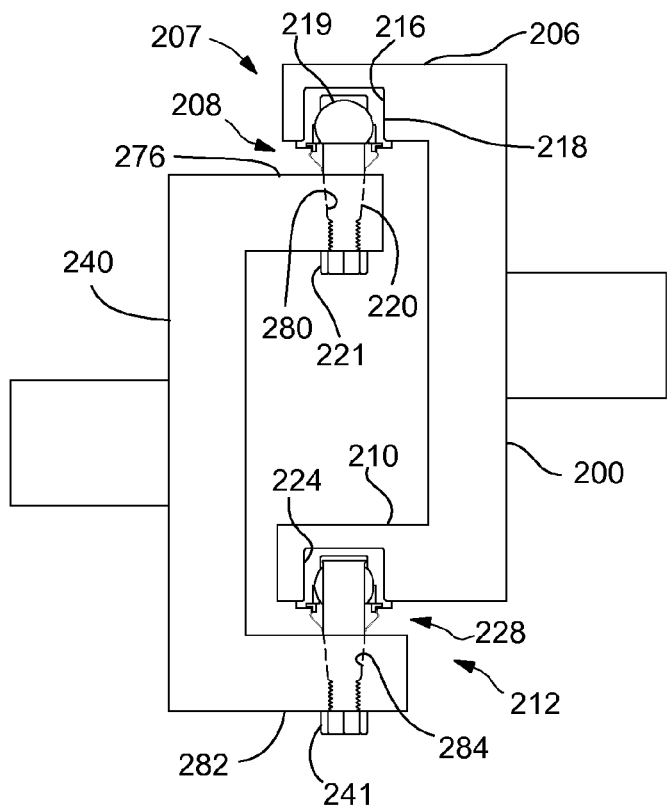
FIG. 1 is a schematic view of a pair of ball joints connecting a first vehicle component to a second vehicle component.

Referring now to FIG. 1, a first vehicle component 200 is coupled to a second vehicle component 240 via an upper joint assembly 207 and a lower joint assembly 212. The first and second vehicle components 200, 240 may be, for example, a steering yoke, steering knuckle or a control arm.

The first vehicle component 200 includes an upper arm 206 having an upper recess 216, and the second vehicle component 240 includes an upper arm 276 having an upper bore 280. A compression ball joint 208 includes a socket 218 mounted in the upper recess 216, with a ball portion 219 mounted therein, and a stud portion 220, integral with the ball portion 219, extending through the upper bore 280. A nut 221 threads onto the stud portion 220 to retain the ball joint 208 in the upper arm 276 of the second vehicle component 240.

The first vehicle component 200 also includes a lower arm 210 having a lower recess 224, and the second vehicle component 240 also includes a lower arm 282 having a lower bore 284. A translational ball joint 228 is mounted in the lower recess 224 and extends through the lower bore 284. A nut 241 secures the translational ball joint 228 to the lower arm 282.

Figure 2:
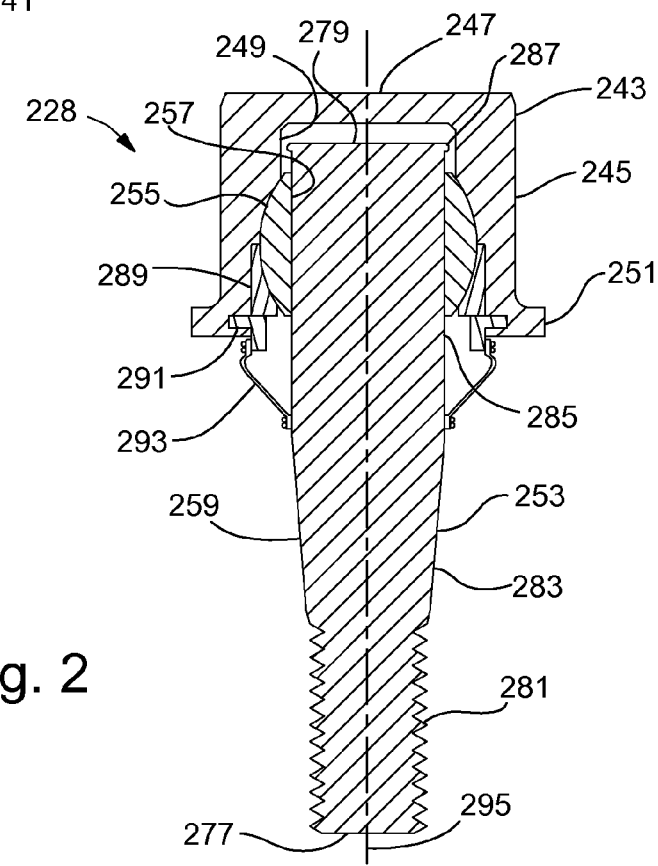
FIG. 2 is a cross section view of a translational ball joint.
Figure 3:
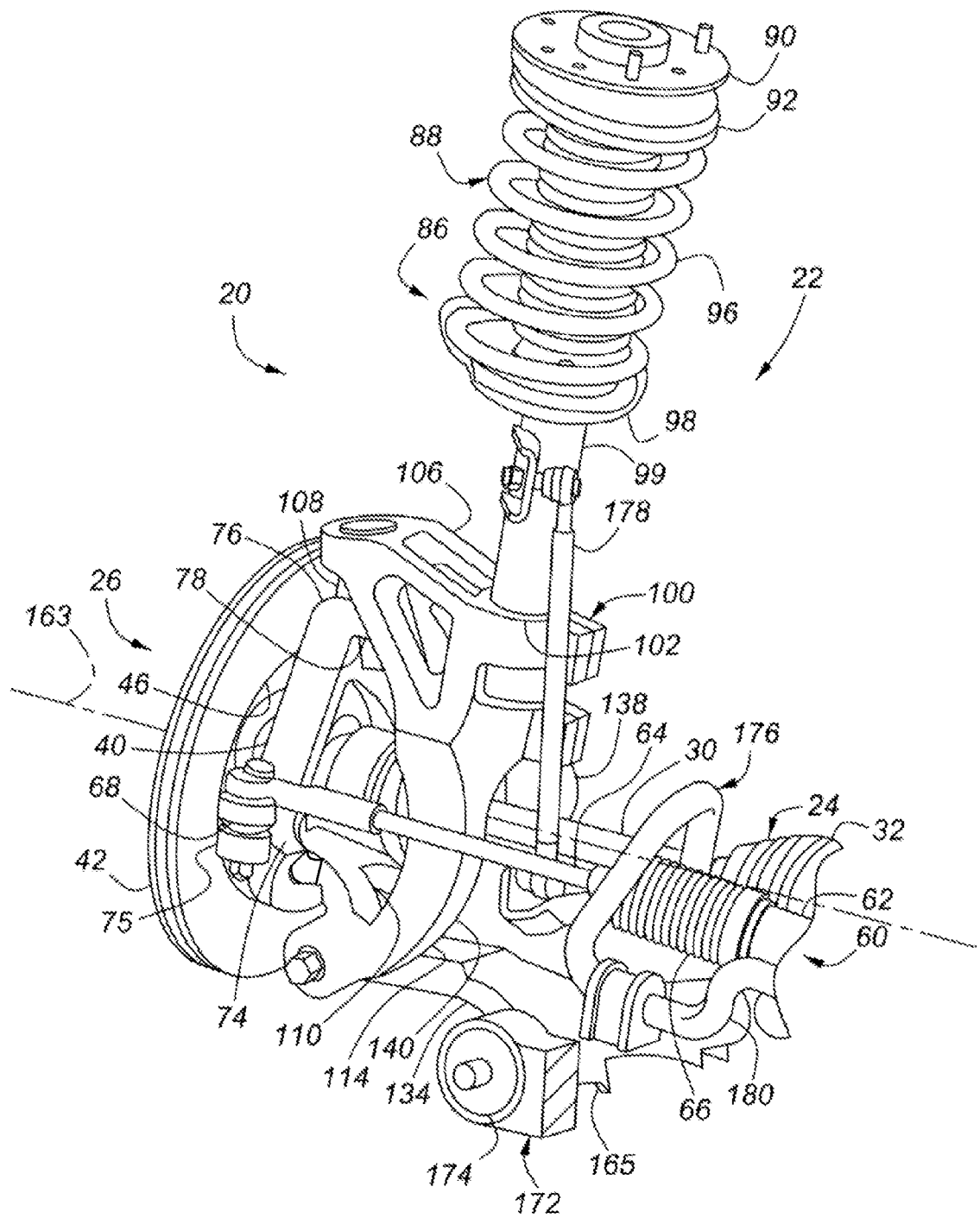
FIG. 3 is a perspective view looking forward and outboard of a portion of a suspension and steering system on a forward, left side of a vehicle.
Figure 4:
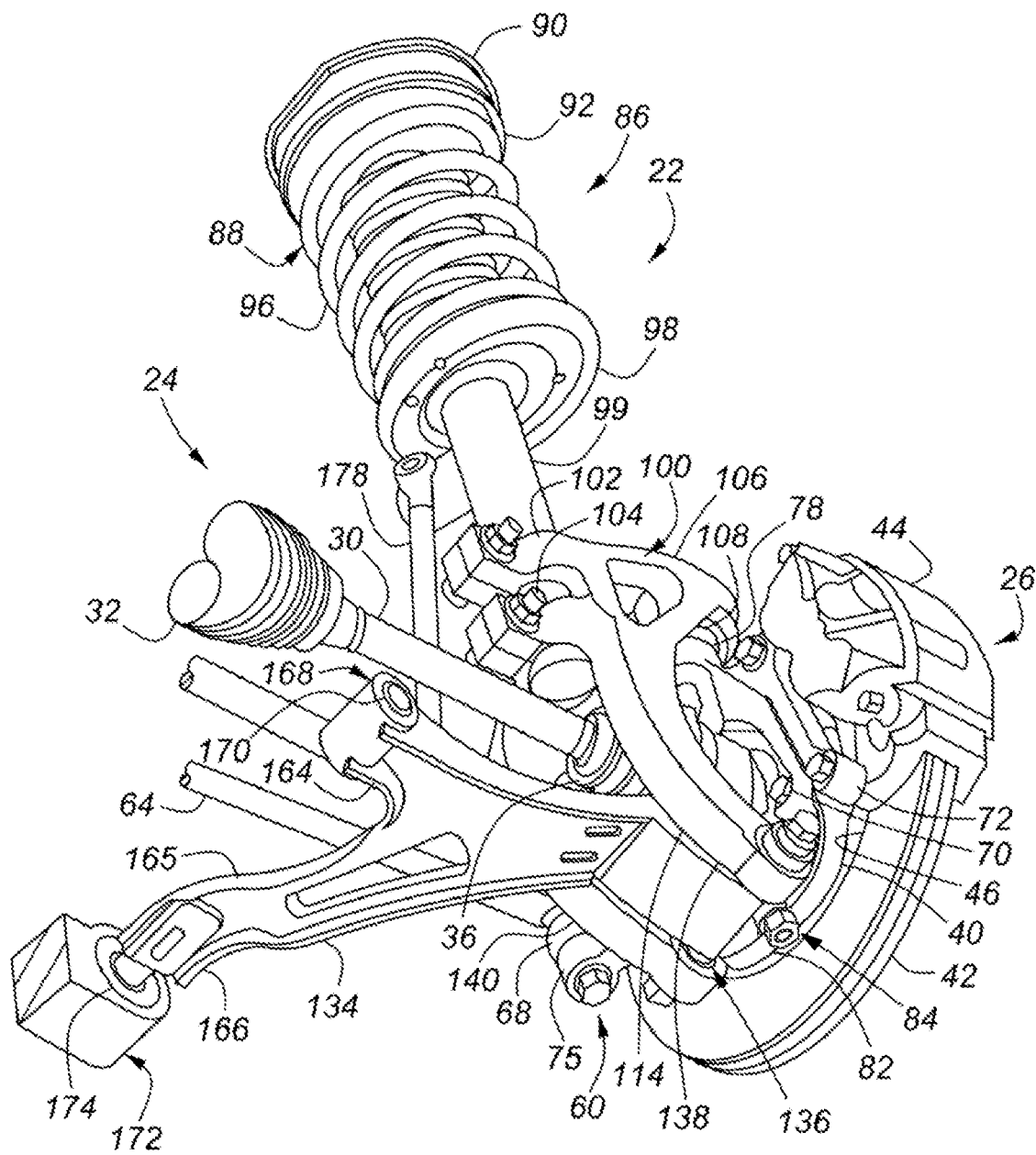
FIG. 4 is a perspective view similar to FIG. 3 but looking outboard, aft, and up.
Figure 5:
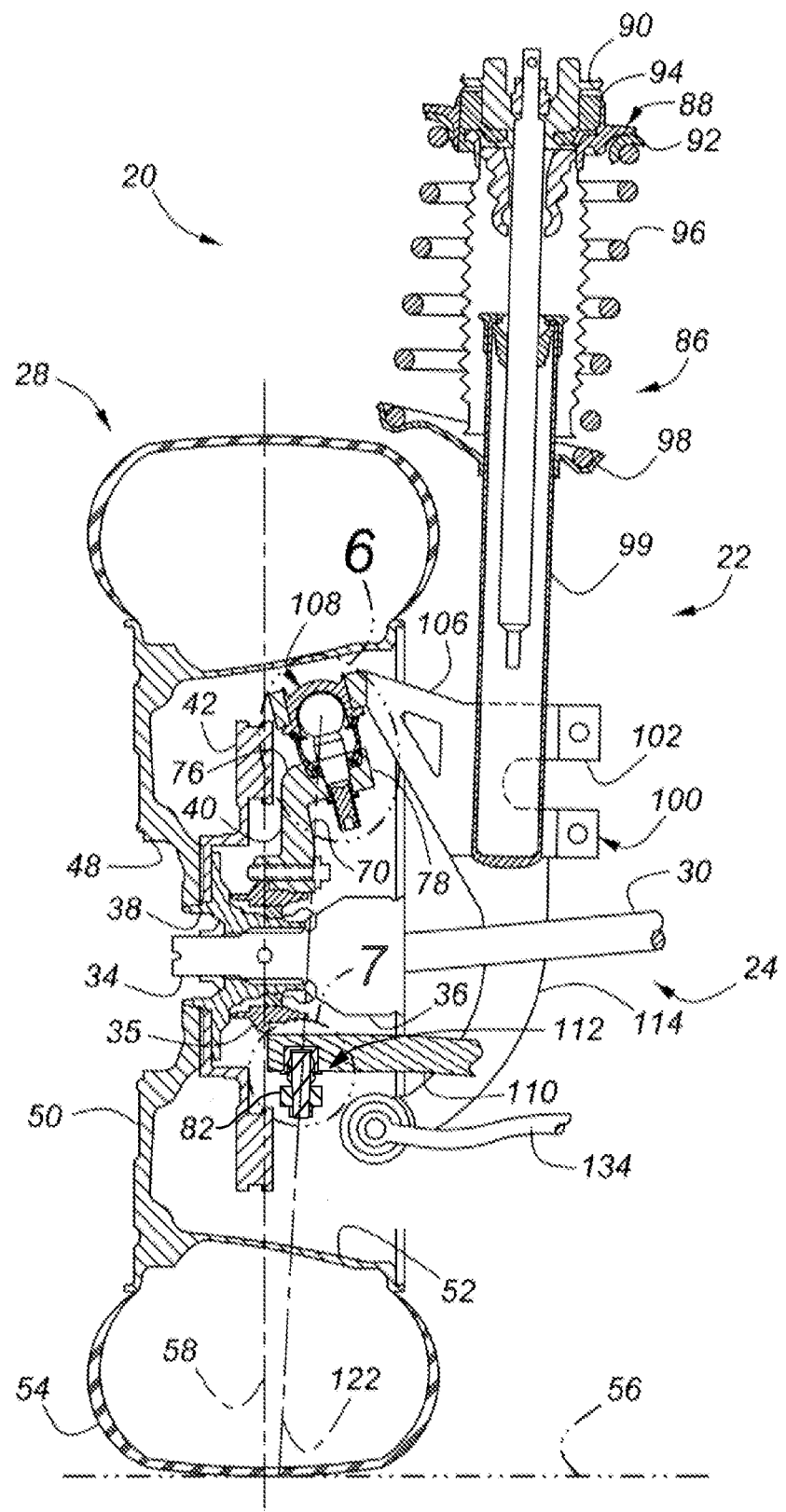
FIG. 5 is an elevation view, in partial cross-section, of the suspension and steering system of FIG. 3.

FIG. 2 illustrates the translational ball joint 228 of FIG. 1 in more detail. The translational ball joint 228 includes a socket 243 having a cylindrical side wall 245 and a circular end wall 247 defining a cavity 249, and an annular mounting flange 251 extending radially from the side wall 245. The translational ball joint 228 also includes a ball stud 253. The ball stud 253 has a ball 255, with a central bore 257 extending through it, and a shank 259 mounted in the central bore 257. The ball 255 is mounted in the cavity 249. The shank 259 includes a threaded portion 281, adjacent to a first end 277, for engaging the nut 241 (FIG. 1), a middle portion 283 that is tapered to mate with the lower bore 284 (FIG. 1), and a cylindrical portion 285, adjacent to an opposed second end 279, that is slidably received in the central bore 257. The second end 279 is upset to create a retention flange 287 in order to assure that the shank 259 is retained in the central bore 257 of the ball 255. An annular bearing 289 and an annular retainer 291 mount in the cavity 249 to retain the ball 255 in the cavity 249. A conventional grease seal 293 may mount between the retainer 291 and the shank 259. Alternatively, the shank-to-ball interface may be splined to prevent rotation between the shank 259 and the ball 255, if so desired.

This translational ball joint 228 has the ability to pivot like a conventional ball joint, and has the added ability of allowing the shank 259 to translate relative to the ball 255, along a ball stud axis 295 (extending longitudinally along the center of the shank 259), even though the shank 259 is an integral part of the translational ball joint 228. This ability to translate may allow for easier assembly of components such as those illustrated in FIG. 1, with the added benefits of allowing the translational ball joint 228 to be fabricated and assembled and to be mounted in an assembly using generally conventional techniques used for conventional ball joints. Thus, the need for special tools during an assembly process can be reduced or eliminated.

FIGS. 3-7 illustrate a specific example of a use for a compression loaded ball joint 108 and a translational ball joint 128 in a portion of steering and suspension system 22, as would be employed on a front left corner of a vehicle 20. While FIGS. 3-7 only illustrate the front left portion, the front right portion is essentially the same and so will not be illustrated herein. The steering and suspension system 22 cooperates with a driveline system, indicated generally at 24, a braking system, indicated generally at 26, and a wheel and tire assembly, indicated generally at 28.

The driveline system 24 includes a half shaft 30 connected at an inboard end to a transaxle (not shown) via a first constant velocity (CV) universal joint 32. An outboard end of the half shaft 30 connects to a drive axle 34 via a second CV joint 36. Wheel bearings 35 mount about a wheel hub 38 that surrounds the drive axle 34 and allow the half shaft 30 to cause the wheel hub 38 and wheel and tire assembly 28 to rotate relative to the suspension and steering system 22. This driveline system 24 can be conventional, if so desired. The wheel hub 38, via the wheel bearing, is supported by a steering knuckle 40, which is discussed below.

The braking system 26 includes a brake rotor 42, which is mounted about and rotates with the wheel bearing 34, and a brake caliper 44, which is mounted on the steering knuckle 40 and extends about the disk-shaped surfaces of the brake rotor—generally the same as a conventional brake arrangement. The disk portion of the brake rotor 42 has an inside diameter 46.

The wheel and tire assembly 28 includes a wheel 48 having a spider (center) portion 50, which mounts to the wheel hub 38 and brake rotor 42, and a rim portion 52, which mounts to and supports a tire 54. The wheel and tire assembly 28, when mounted on the vehicle 20 and supporting it on a surface, indicated generally by the phantom line 56 in FIG. 5, defines a wheel centerline plane, indicated generally by the center line 58 in FIG. 5.

The steering portion, indicated generally at 60, of the steering and suspension system 22 may include a rack and pinion housing 62 with a rack (not shown) connected to a tie rod 64 via a ball joint 66. The tie rod 64, in turn, connects to the steering knuckle 40 via a second ball joint 68. In general, the steering portion 60 of the steering and suspension system 22 may be conventional, with the exception that the steering knuckle 40 has a different configuration. In addition, with the change in geometry of the steering knuckle 40 from that of a conventional McPherson strut suspension, which causes a steering axis (discussed below) to be located more outboard, the steering rack (not shown) may need to increase in length somewhat.

The steering knuckle 40 has a central portion 70 that mounts around the wheel bearings 35, a forward arm 72 upon which the brake caliper 44 is mounted, and a rearward arm 74 including a steering flange 75 to which the ball joint 68 of the tie rod 64 mounts. An upper portion 76 of the steering knuckle 40 includes an upper mounting flange 78 within which is located an upper joint receptacle 80. A lower arm 82 of the steering knuckle 40 includes a lower joint bore 84.

The suspension portion 86 of the steering and suspension system 22 includes a strut assembly 88, which has an upper strut mount 90 that is mounted to a strut tower (not shown) that is part of the vehicle frame or body (not shown). Preferably, the strut tower is conventional and located at its conventional location for interchangeability with a McPherson strut suspension in the particular vehicle. The upper strut mount 90 includes an upper spring seat 92 and a strut mount bearing (also called a spring seat bearing) 94. A coil spring 96 mounts between the upper spring seat 92 and a lower spring seat 98. The strut assembly 88 also includes a strut shock absorber assembly 99. Of course, as with a conventional McPherson strut suspension, the coil spring 96 supports the weight of the vehicle 20 while the shock absorber assembly 99 damps the vertical motion of the vehicle 20. And, in fact, if so desired, the strut assembly 88 may be the same as the strut assembly in the conventional McPherson strut suspension for that vehicle. On the other hand, one of the advantages with the steering and suspension system 22 is that the strut mount bearing 94—which is needed in conventional McPherson strut suspensions to allow its spring to rotate at one end when the vehicle steers—may be eliminated, if so desired.

The suspension portion 86 of the steering and suspension system 22 also includes a strut extension member 100. The strut extension member 100 has strut clamp arms 102 that are secured to the lower end of the strut assembly 88 by mounting bolts 104. The strut extension member 100 also includes upper support arms 106 that extend from the strut clamp arms 102 and mount to the upper mounting flange 78 of the steering knuckle 40 via a compression loaded upper ball joint 108 (discussed below). Lower support arms 110 mount to the lower arm 82 of the steering knuckle 40 via a lower joint assembly 112 (discussed below). The lower support arms 110 extend from an extension fork 114, which also extends from the strut clamp arms 102 and forms a part of the strut extension member 100.

Figure 6:
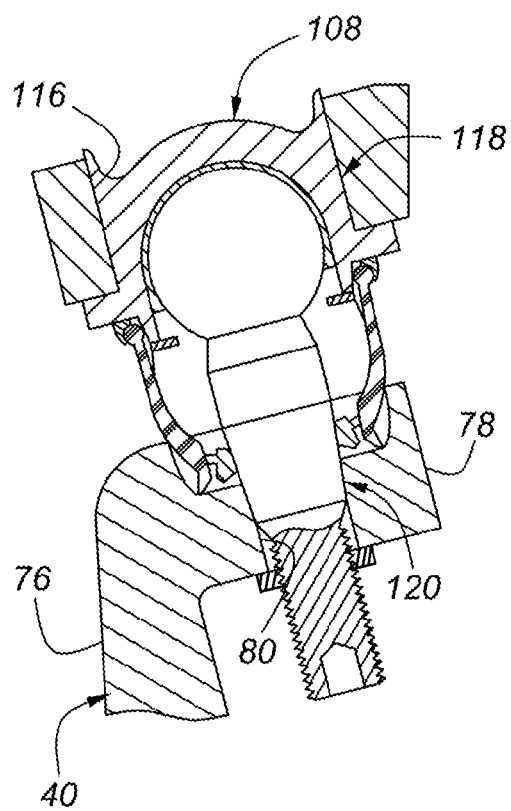
FIG. 6 is a partial cross-sectional view, on an enlarged scale, of encircled area 6 in FIG. 5.
Figure 7:
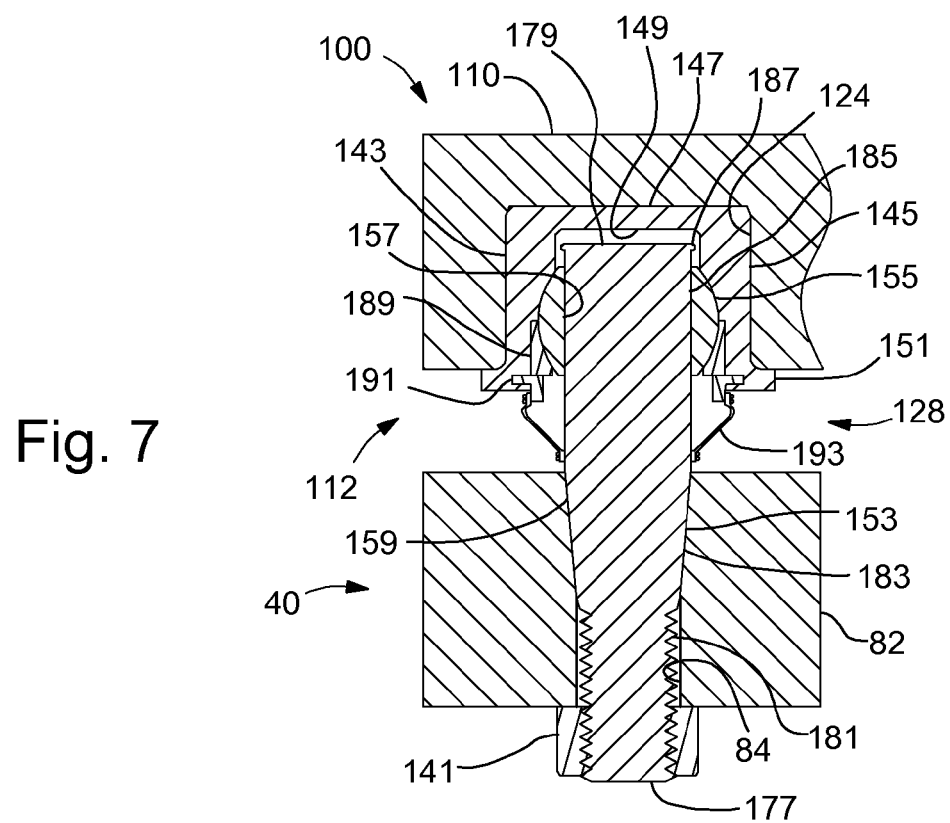
FIG. 7 is a partial cross-sectional view, on an enlarged-scale, of encircled area 7 in FIG. 5.

The upper support arms 106 of the strut extension member 100 have an upper receptacle 116 within which is mounted a portion of the compression loaded upper ball joint 108, (best seen in FIG. 6). The upper ball joint 108 also mounts to the upper joint receptacle 80 of the steering knuckle 40. This upper ball joint 108 carries the vertical loads generally through its bearing surface while providing for the required rotation and pivoting of the strut extension member 100 relative to the steering knuckle 40 during assembly and vehicle operation. Preferably, a ball and socket portion 118 of the upper ball joint 110 is retained in the upper receptacle 116 of the strut extension member 100, while a stud portion 120 of the upper ball joint 110 is mounted in the upper joint receptacle 80 of the steering knuckle 40. By employing a compression loaded upper ball joint 108 with this orientation, a relatively lower amount of precision in aligning the components is required during assembly—it allows for misalignment due to component manufacturing variation (tolerances) and component deflection under service loads. Moreover, since this upper ball joint 108 defines an upper end of a steer axis, indicated generally by center line 122 in FIG. 5, it is preferably located close to the brake rotor 42 inside the rim portion 52 of the wheel 48 in order to maintain the steer axis 122 close to the wheel centerline plane 58.

The lower joint assembly 112 (best seen in FIG. 7) pivotally connects the lower support arms 110 of the strut extension member 100 to the lower arm 82 of the steering knuckle 40 via a translational ball joint 128. The lower support arms 110 have a lower receptacle 124 within which is mounted a portion of the translational ball joint 128. The translational ball joint 128 also engages to the lower joint bore 84 of the lower arm 82.

The translational ball joint 128 (best seen in FIG. 7) includes a socket 143 having a cylindrical side wall 145 and a circular end wall 147 defining a cavity 149, and an annular mounting flange 151 extending from the side wall 145. The translational ball joint 128 also includes a ball stud 153. The ball stud 153 has a ball 155, with a central bore 157 extending through it, and a shank 159 mounted in the central bore 157. The ball 155 is mounted in the cavity 149. The shank 159 includes a threaded portion 181, adjacent to a first end 177, for engaging a nut 141 that secures the translational ball joint 128 to the lower arm 82. The shank 159 also includes a middle portion 183 that is tapered to mate with the lower bore 84, and a cylindrical portion 185, adjacent to an opposed second end 179, that is slidably received in the central bore 157. The second end 179 is upset to create a retention flange 187 in order to assure that the shank 159 is retained in the central bore 157 of the ball 155. An annular bearing 189 and an annular retainer 191 mount in the cavity 149 to retain the ball 155 in the cavity 149. A conventional grease seal 193 may mount between the retainer 191 and the shank 159.

Advantages are obtained by the lower joint assembly 112 including the translational ball joint 128, having both a pivoting motion like a conventional ball joint and an additional translation motion of the shank 159 relative to the ball 155. Straight vertical assembly of the strut extension member 100 onto the steering knuckle 40 is enabled, while allowing for misalignment that may exist due to component manufacturing variation (tolerances) and misalignment created due to component deflection under service loads. The translational ball joint 128 also allows the steering knuckle 40 to pivot relative to the lower support arms 110 of the strut extension member 100 when the vehicle 20 is steering. In addition, since this lower joint assembly 112 defines a lower end of the steer axis 122, its outboard location reduces the spindle length. Preferably, this lower joint assembly 112 is adjacent to or between the inside diameter 46 of the brake rotor 42 and the outer surface of the wheel bearings 35 in order to be as far outboard as possible.

Moreover, the advantages are obtained while allowing the translational ball joint 228 to be fabricated and assembled employing generally conventional techniques used for conventional ball joints. Thus, the need for special tools during an assembly process can be reduced or eliminated.

The extension fork 114 of the strut extension member 100 includes a forward arm 138 spaced from a rearward arm 140 that each connect to a lower control arm 134 via a compliant hinge joint 136. The compliant hinge joint 136 retains the strut extension member 100 to the lower control arm 134 while still allowing for pivoting between the two. This compliant hinge joint 136, by connecting the strut extension member 100 to the lower control arm 134, acts to prevent strut rotation. Also, preferably, the compliant hinge joint 136 includes portions spaced apart fore and aft so that one is forward of a wheel center of rotation—indicated generally by centerline 163 in FIG. 3—and the other is aft of the wheel center of rotation 163. The wheel center of rotation 163 is simply the axis about which the wheel and tire assembly 28 rotates. The longer moment arm created by spacing apart portions of the compliant hinge joint 136 improves the ability to react moments (due to fore-aft loads created when the vehicle 20 is accelerating or braking) induced in the steering and suspension system 22 through the lower control arm 134 to the vehicle frame or body. Moreover, with the two portions of the joint 136 being on either side of the wheel center of rotation 163, the lateral stiffness of each portion of the joint 136 may be tuned independent of the other when tuning the toe characteristics for lateral force operation, which gives an extra degree of freedom in tuning the suspension. The location and stiffness of the compliant hinge joint 136 can be tuned to improve tractive and brake steer.

An inboard portion 165 of the lower control arm 134 includes two spaced apart arms, a front arm 164 and a rear arm 166, that each connect to the vehicle frame or body (not shown). The front arm 164 of the lower control arm 134 includes a pivotable joint 168 with a handling bushing 170, while the rear arm 166 of the lower control arm 134 includes a pivotable joint 172 with a comfort bushing 174. These two joints 168, 172 react the loads introduced into the lower control arm 134 by the compliant hinge joint 136. Each can be tuned independently to obtain the desired characteristics.

The steering and suspension system 22 may also include a stabilizer assembly 176. The stabilizer assembly 176 may include separate members 178 and 180 that attach to the vehicle frame or body at various locations. The stabilizer assembly 176 may be conventional and so will not be discussed further herein.

The steering and suspension assembly 22 disclosed herein provides for improved performance over a conventional McPherson strut suspension by reducing the spindle length, while allowing for substantial tuning to obtain the desired operating characteristics. In comparing this steering and suspension system 22 to a conventional McPherson strut suspension, the spindle length is significantly less, yet camber and toe can remain essentially unchanged, caster can be changed independent of a centerline axis of the strut and so do not need to change the frame or body structure to be accomplished, the king pin inclination (KPI) is more vertical for improved camber angle for the outside wheel during a vehicle turn, and scrub can be changed independent of the strut orientation. Moreover, all of this is achieved while maintaining a simple assembly process that can use conventional suspension/steering assembly techniques.

While certain embodiments of the present invention have been described in detail, those familiar with the art to which this invention relates will recognize various alternative designs and embodiments for practicing the invention as defined by the following claims.

What is claimed is:

1. A translational ball joint for connecting a first vehicle component to a second vehicle component comprising:
   a socket having a side wall and an end wall defining a cavity, the socket being mountable in the first vehicle component;
   a ball stud including a ball, mounted in the cavity and having a central bore, and a shank, including a first end located outside of the cavity and an opposed second end located in the cavity, the shank including a cylindrical portion adjacent to the second end that is slidably received in the central bore and a retention flange extending radially outward from the second end that has a diameter that is larger than a diameter of the central bore to thereby prevent the retention flange from sliding through the central bore, the central bore being splined and the cylindrical portion of the shank being splined in a mating engagement with the splines in the central bore to prevent rotation of the ball relative to the shank; and
   a retainer operatively engaging the socket to retain the ball in the cavity of the socket.

2. The translational ball joint of claim 1 wherein the shank includes a threaded portion located adjacent to the first end that is extendable through a receptacle in the second vehicle component for threadably receiving a nut thereon.

3. The translational ball joint of claim 2 including an annular bearing mounted in the cavity between the ball and the socket, and wherein the retainer is an annular member mounted to the socket in the cavity that abuts and retains the annular bearing in the cavity.

4. The translational ball joint of claim 2 wherein the shank includes an intermediate portion between the cylindrical portion and the threaded portion having a conically tapered surface that is matable with a tapered portion of the receptacle in the second vehicle component.

5. The translational ball joint of claim 1 wherein the socket includes a mounting flange extending radially outward from the side wall and engageable with the first vehicle component.

6. The translational ball joint of claim 1 including an annular bearing mounted in the cavity between the ball and the socket, and wherein the retainer is an annular member mounted to the socket in the cavity that abuts and retains the annular bearing in the cavity.

7. The translational ball joint of claim 1 wherein the shank includes an intermediate portion adjacent to the cylindrical portion having a conically tapered surface that is matable with a tapered portion of a receptacle in the second vehicle component.

8. A method of forming a translational ball joint comprising the steps of:
   forming a socket having a cylindrical side wall affixed to a circular end wall to defining a cavity;
   forming a shank having a first end with threads adjacent thereto and a second end with a retention flange extending radially therefrom;
   forming splines on the shank adjacent to the second end;
   forming a ball including a central bore having a diameter that is less than a diameter of the retention flange;
   forming splines in the central bore configured for engagement with the splines on the shank to prevent rotation of the ball relative to the shank;
   sliding the shank into the central bore to form a ball stud;
   sliding the ball and the second end of the shank into the cavity such that the retention flange is adjacent to the end wall; and
   securing a retainer to the socket to prevent the ball from being removed from the cavity.

9. The method of claim 8 wherein the retention flange is formed on the second end of the shank by upsetting the material on the second end of the shank.

10. The method of claim 8 including a step of inserting an annular bearing in the cavity between the side wall and the ball prior to the step of securing the retainer.

* * * * *